United States Patent [19]

Noguchi et al.

[11] Patent Number: 4,563,691

[45] Date of Patent: Jan. 7, 1986

[54] THERMO-SENSITIVE RECORDING APPARATUS

[75] Inventors: Akio Noguchi; Haruhiko Moriguchi; Norihiko Koizumi; Takashi Ohmori; Toshiharu Inui, all of Kanagawa, Japan

[73] Assignee: Fuji Xerox Co., Ltd., Tokyo, Japan

[21] Appl. No.: 685,382

[22] Filed: Dec. 24, 1984

[51] Int. Cl.[4] .............................................. G01D 15/10

[52] U.S. Cl. ....................................... 346/76; 219/216

[58] Field of Search ................ 346/76 R, 76 PH, 151; 219/216 PH; 101/93.03, 93.04; 400/120; 250/316.1, 317.1, 318; 358/296–298

[56] References Cited

U.S. PATENT DOCUMENTS 4,284,876 8/1981 Ishibashi et al. ................. 101/93.04

4,415,908 11/1983 Sugiura ......................... 219/216 PH 4,464,669 8/1984 Sekiya et al. ................... 346/76 PH 4,494,126 1/1985 Todoh ................................. 358/298

*Primary Examiner*—E. A. Goldberg

*Assistant Examiner*—A. Evans

*Attorney, Agent, or Firm*—Finnegan, Henderson, Farabow, Garrett & Dunner

[57] ABSTRACT

A thermo-sensitive recording apparatus individually controls the energization level of each of a plurality of heater elements formed on a substrate and constituting a thermal print head. In generating each energization level, the present and previous status of an individual heater element and selected neighboring elements are taken into consideration. Other factors combined in a selectively weighted manner include the latent heat of the individual heater element and its neighboring heater elements, the resistance of the heater element, the percentage of heater elements to be activated during the printing of a line, and the temperature of the substrate.

10 Claims, 19 Drawing Figures

FIG. 13

| | (1) | | (2) | | (3) | | (4) | | (5) | | (6) | | (7) | | (8) | |
|---|---|---|---|---|---|---|---|---|---|---|---|---|---|---|---|---|
| Xi Xi-1 | MAX | 0.4 | MAX | 0.3 | MAX | 0.35 | MAX | 0.3 | MAX | 0.2 | MAX | 0.35 | MAX | 0.3 | MAX | 0.05 |
| Bi | MAX | 0 | MAX | 0 | MIN | 0.4 | MAX | 0 | MIN | 0.4 | MAX | 0 | MIN | 0.4 | MIN | 0.4 |
| Ri | MIN | 0 | MAX | 0.3 | MIN | 0 | MIN | 0 | MAX | 0.3 | MAX | 0.3 | MIN | 0 | MAX | 0.3 |
| Wi | MIN | 0 | MIN | 0 | MIN | 0 | MAX | 0.15 | MIN | 0 | MAX | 0.15 | MAX | 0.15 | MAX | 0.15 |
| T | 0.4 | | 0.6 | | 0.75 | | 0.45 | | 0.9 | | 0.8 | | 0.85 | | 0.9 | |

| | (9) | | (10) | | (11) | | (12) | | (13) | | (14) | | (15) | | (16) | |
|---|---|---|---|---|---|---|---|---|---|---|---|---|---|---|---|---|
| Xi Xi-1 | MIN | 0.35 | MIN | 0.6 | MIN | 0.6 | MIN | 0.6 | MIN | 0.55 | MIN | 0.45 | MIN | 0.6 | MIN | 0.55 |
| Bi | MIN | 0.4 | MAX | 0 | MAX | 0 | MIN | 0.4 | MAX | 0 | MIN | 0.4 | MAX | 0 | MIN | 0.4 |
| Ri | MAX | 0.3 | MIN | 0 | MAX | 0.3 | MIN | 0 | MIN | 0 | MAX | 0.3 | MAX | 0.3 | MIN | 0 |
| Wi | MAX | 0.15 | MIN | 0 | MIN | 0 | MIN | 0 | MAX | 0.15 | MIN | 0 | MAX | 0.15 | MAX | 0.15 |
| T | 1.2 | | 0.6 | | 0.9 | | 1.0 | | 0.7 | | 1.15 | | 1.05 | | 1.1 | |

THERMO-SENSITIVE RECORDING APPARATUS

BACKGROUND OF THE INVENTION

1. Field of the Invention

The present invention generally relates to a thermo-sensitive recording apparatus for performing thermal recording by using a thermal head, and particularly to a thermo-sensitive recording apparatus in which thermal energy for printing can be corrected.

2. Description of the Prior Art

A recording apparatus for performing thermal recording by using a thermo-sensitive paper or transfer type thermo-sensitive recording medium is widely used for facsimile equipment, printers, etc. Generally, in such a recording apparatus, a thermal head in which a plurality of heater units or elements are arranged in one line is used as a recording head. Since the thermal head produces thermal energy for printing, there arises a problem of deterioration in picture quantity due to the energy. The causes for deterioration in picture quality may be classified into six factors as follows:

(1) Heat storage in thermal head;
(2) Data of thermal history;
(3) Temperature of substrate of thermal head;
(4) Variations in resistance of heater elements;
(5) Variations in recording interval; and
(6) Voltage drop due to black percentage.

Heat storage in the thermal head means that at any one time the respective heater elements may be different from each other in heat storage depending on the pattern to be printed. The heat storage state of a heater element may be affected by other heater elements arranged close by.

The data of thermal history means the state of the head as a result of printing information on the preceding line. In a thermo-sensitive recording apparatus the pulse width or amplitude of a voltage pulse (printing pulse) controls operation of the thermal head. The thermal history of the head affects recording in the next line.

Temperature of the substrate of a thermal head means the temperature of a substrate of the thermal head on which a number of heater elements are formed.

Variations in resistance of heater elements mean variations in resistance resulting from manufacturing. There are two kinds of variations. One is variation in resistance among the heater elements in one thermal head, and the other is variation in the mean value of resistance among a plurality of thermal heads. The former variation may be about ±25% and the latter variation may fall within a range of 200 to 300Ω.

Variations in recording interval mean variations in time interval from the starting of printing on one line to the starting of printing on the next line.

Finally, voltage drop due to black percentage means that the value of the voltage drop of a power source in energizing the heater elements varies depending on the rate or percentage of black dots occupying one line. As the source voltage decreases, the density of an image is lowered correspondingly.

Conventionally, thermal energy correction has been performed separately for the respective factors. For example, in a rapid recording type thermo-sensitive recording apparatus having a printing cycle equal to or shorter than 10 m sec., the printing operation may be started before latent heat has been sufficiently purged and heat storage in each heater element then causes a serious problem. In such an apparatus, therefore, the state of heat storage was calculated to vary the pulse width or amplitude of the recording pulse to be applied to each heater element to control the thermal energy applied to the same. Alternatively, in a recording apparatus connected to a computer, the recording interval may largely vary for various data processing operations. In such an apparatus, for example, a slight current was caused to flow in the thermal head during non-printing periods to prevent a large variation in temperature of each heater element due to the lapse of time.

Thus, thermal energy correction has been effected separately for the above-mentioned factors in the conventional thermo-sensitive recording apparatus. There has been no effective countermeasures when a combination of the different factors have caused deterioration in picture quantity in one apparatus. A combination of various correction means applied separately to counteract the factors may attain satisfactory effects under certain circumstances. Nonetheless, there is a danger of deterioration in picture quantity due to an excess or deficiency of heat generation in each heater element if attention is paid to individual heater elements.

SUMMARY OF THE INVENTION

It is therefore an object of the present invention to eliminate the disadvantages of latent heat and non-uniformities in a conventional thermo-sensitive recording apparatus.

It is another object of the present invention to provide a thermo-sensitive apparatus in which deterioration in picture quantity due to the thermal energy in the thermal head can be synthetically removed.

These and other objects are attained by a thermo-sensitive recording apparatus in which thermal recording is made on successive lines of a medium under the control of selective energization of a plurality of heater elements formed in a substrate and constituting a thermal head, the apparatus comprising heat storage correction data forming means for generating latent heat correction data corresponding to the quantity of latent heat energy stored in each of the heater elements, a thermal history correction data forming means for generating thermal history correction data for each of the heater elements in accordance with the state of the elements during printing of a selected number of preceding print lines, a heater element resistance value correction data forming means for generating resistance data for each of the heater elements corresponding to the actual resistance of the heater elements, a black percentage correction data forming means for forming solid image correction data for energy to be applied to the thermal head in accordance with the number of heater elements to be energized during printing of a print line, substrate temperature correction data forming means for forming substrate correction data corresponding to the temperature of the substrate, and applied energy control means for individually controlling energization of the heater elements in accordance with the latent heat correction data, the thermal history correction data, the resistance data, the solid image correction data, and the substrate correction data.

BRIEF DESCRIPTION OF THE DRAWINGS

The manner in which the above and other objects, features, and advantages of the present invention are attained will become more apparent from the following detailed description when considered in light of the drawings, wherein:

FIG. 13 is an explanatory diagram showing in particular a part of the correspondency between the pulse width T and the various data;

DETAILED DESCRIPTION OF THE PREFERRED EMBODIMENT

Figure 1:
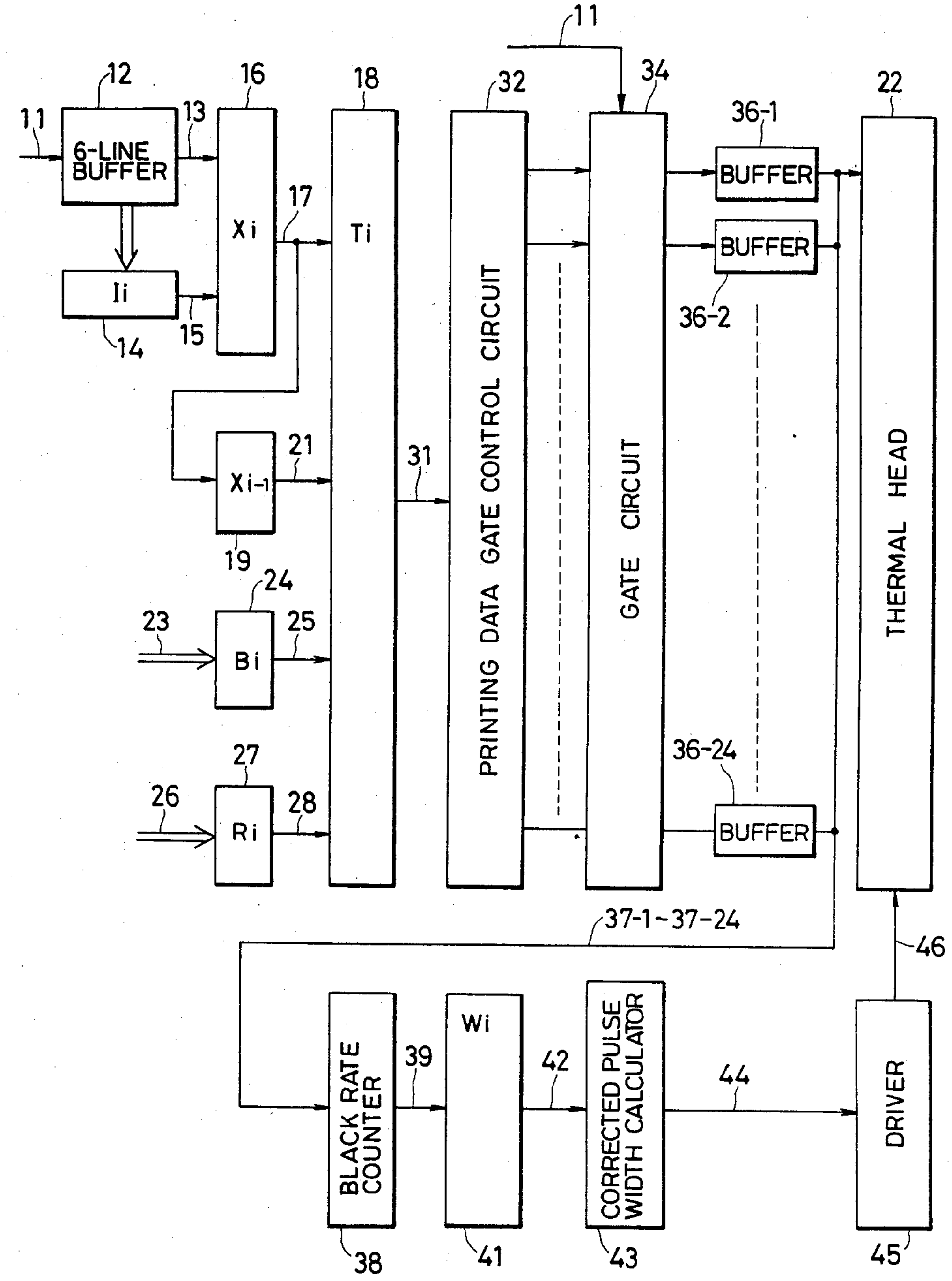
FIG. 1 is a block diagram showing a substantial portion of the thermo-sensitive recording apparatus of the present invention.

FIG. 1 illustrates the outline of the thermo-sensitive recording apparatus according to a preferred embodiment of the present invention. In the thermo-sensitive recording apparatus the above-mentioned six factors affecting the quality of printing are eliminated.

An $X_i$ calculator 16 produces correction data as to the heat storage status of a thermal head by using buffer output data 13 of a 6-line buffer 12 for storing printing data 11 and interval data 15 calculated by an $I_i$ calculator 14. The produced heat storage correction data 17 are supplied to both a $T_i$ calculator 18 and an $X_{i-1}$ memory 19. The $X_{i-1}$ memory delays the heat storage correction data 17 by a time corresponding to the printing of one line and supplies the delayed data to the $T_i$ calculator 18 as heat history correction data 21. A temperature sensitive element (not shown) such as a thermistor is arranged on a substrate of a thermal head 22. Temperature information 23 produced from the temperature sensitive element is applied to a $B_i$ calculator 24.

Temperature correction data 25 calculated by the $B_i$ calculator 24 are also supplied to the $T_i$ calculator 18. Resistance information 26 of every heater element in the thermal head 22 is applied to an $R_i$ calculator 27 and resistance correction data 28 obtained therefrom are also supplied to the $T_i$ calculator 18.

On the basis of the correction data 17, 21, 25 and 28, the pulse width to be applied to each heater element is determined in the $T_i$ calculator 18. The pulse width data 31 are supplied to a printing data gate control circuit 32 to perform on-off control for twenty-four gates of a gate circuit 34 in accordance with the printing pulse width. The gate circuit 34 has twenty-four gates and selectively supplies printing data 11 to buffers 36-1 to 36-24 in accordance with the state of the respective gates.

Printing data 37-1 to 37-24 respectively stored in the buffers 36-1 to 36-24 for every recording operation are successively supplied to the thermal head 22 and a black rate counter 38. The black rate counter 38 counts the rate or percentage of the printing dots, that is, the black rate in every recording operation.

Count data 39 are supplied to a $W_i$ calculator 41 in which pulse width correction data 42 are produced for compensating for printing energy in conjunction with the source voltage in view of the black rate. The pulse width correction data 42 are supplied to a corrected pulse width calculator 43 in which the applied pulse time-width in every unit recording operation is calculated. Applied pulse width data 44 obtained in the calculator 43 are supplied to a driver 45. An applied pulse 46 determined in the driver 45 is supplied to the thermal head 22 to perform the recording operation corresponding to the applied pulse.

Upon completion of unit recording operations with respect to all the buffers 36-1 to 36-24, the recording operation for one line is finished and subscanning is performed on a recording paper by a not-shown subscanning mechanism. Repeating this operation, recording is made successively one line after another.

Figure 2:
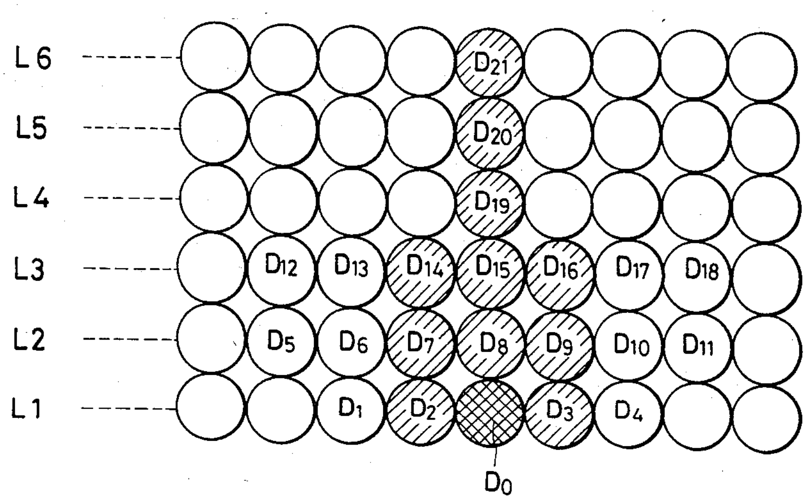
FIG. 2 is a diagram showing the arrangement of reference data to printing data stored in a 6-line buffer of the apparatus of FIG. 1.

The $X_i$ calculator 16 calculates the state of heat storage in each heater element taking the recording interval into consideration. Referring to FIG. 2, the principle of calculation is explained. A data row L1 disposed in the lowest part of the drawing represents data presently being reproduced as a line of printing. A data row L2 disposed just above the data row L1 represents the data line preceding data row L1. Data row L6 disposed in the uppermost part of FIG. 2 represents the fifth preceding data line. The data corresponding to the row L1–L6 are stored in the 6-line buffer 12.

Within data row L1, attention is paid to a given data $D_0$. The data $D_0$ corresponds to a given heater element with which printing is being performed. In this case, eleven reference data $D_2$, $D_3$, $D_7$ to $D_9$, $D_{14}$ to $D_{16}$ and $D_{19}$ to $D_{21}$ (hatched in the drawing) are used for obtaining thermal history on the basis of the pulse width used for past printing.

The heat storage status $X_i$ with respect to the data $D_0$ is obtained by predeterminedly weighting the black data (printing data) in the above-mentioned eleven data about the data $D_0$ and adding the weighted data to each other. The weighting is performed so that the data $D_8$ most significantly affecting the aimed data $D_0$ are most heavily weighted. Specifically, the weighting is performed with the values as shown in the following Table 1.

TABLE 1

| DATA | WEIGHT |
|---|---|
| $D_2$-$D_3$ | 70 |
| $D_7$-$D_9$ | 40 |
| $D_8$ | 160 |
| $D_{14}$-$D_{16}$ | 17 |
| $D_{15}$ | 100 |
| $D_{19}$ | 60 |
| $D_{20}$ | 40 |
| $D_{21}$ | 24 |

Heat may be generated in each heater element in the thermal head not only by voltage application between adjacent electrodes but by a so-called leakage current. The generated heat is also stored and printing is affected by such heat storage.

Figure 3:
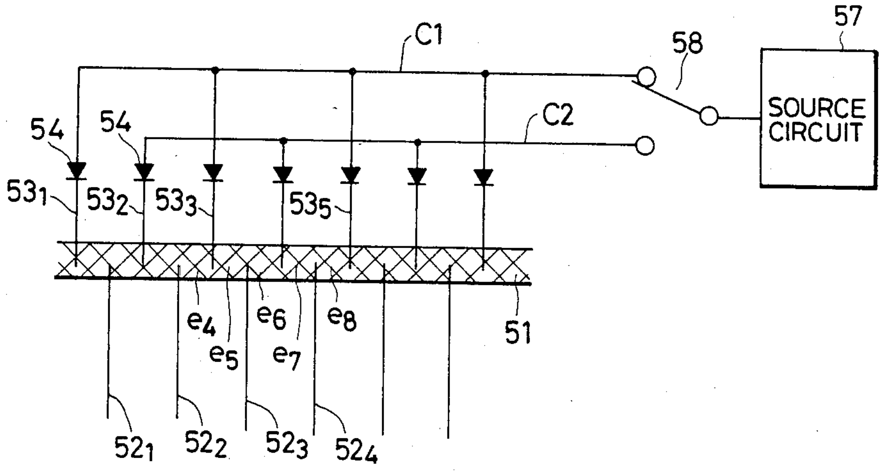
FIG. 3 is a circuit diagram for explaining the leakage current occurring in the thermal head of the apparatus of FIG. 1.

Referring to FIG. 3, the leakage current in a recording head will be briefly described. An elongated resistive heater 51 is formed on a substrate of a thermal head and two groups of electrodes 52 and 53 are alternately attached to the resistive heater 51 at a predetermined interval. One group of electrodes $52_1$, $52_2$ . . . are grounded through switching elements for performing on/off operations according to picture data. In the other group of electrodes $53_1$, $53_2$, . . . , the electrodes of odd numbers are connected to a first common line C1 through respective diodes 54 and the electrodes of even numbers are connected to a second common line C2 through respective diode 54. A printing pulse is supplied to the common lines C1 and C2 from a source circuit 57 through a switch circuit 58 when printing is to be performed.

For example, assume now that a printing pulse has been supplied to the common line C1 under the condition that the switching circuit 58 selected the first common line C1 as shown in the drawing. If the two electrodes $52_2$ and $52_3$ adjacent to the electrode $53_3$ are grounded through the switching element, a current flows through each of the electrodes $52_2$ and $52_3$ and heat is generated in the two heater elements e4 and e5. If only one of the electrodes $52_2$ and $52_3$ is grounded, a current flows only into the grounded electrode so that heat is generated only in the corresponding heater element. If both the electrodes are off, no heat is generated in the heater elements e4 and e5. This is the basic state of energization control of a thermal head.

Assuming that the electrode $52_3$ is not grounded when a voltage is applied to the electrode $53_3$, and the electrode $52_4$ adjacent to the electrode $52_3$ is grounded, heat is generated in the heater element e8 through the electrode $53_5$. In this case, however, current also flows in the electrode $52_4$ from the electrode $53_3$ through the heater elements e5–e7, so that the heat is slightly generated in these heater elements e5–e7. This is heat generation due to a leakage current. The quantity of heat generation due to a leakage current is relatively small. Accordingly, in this embodiment, three data $D_0$, $D_8$ and $D_{15}$ shown in FIG. 2 are selected as the data for taking into consideration the influence by heat storage.

Figure 4:
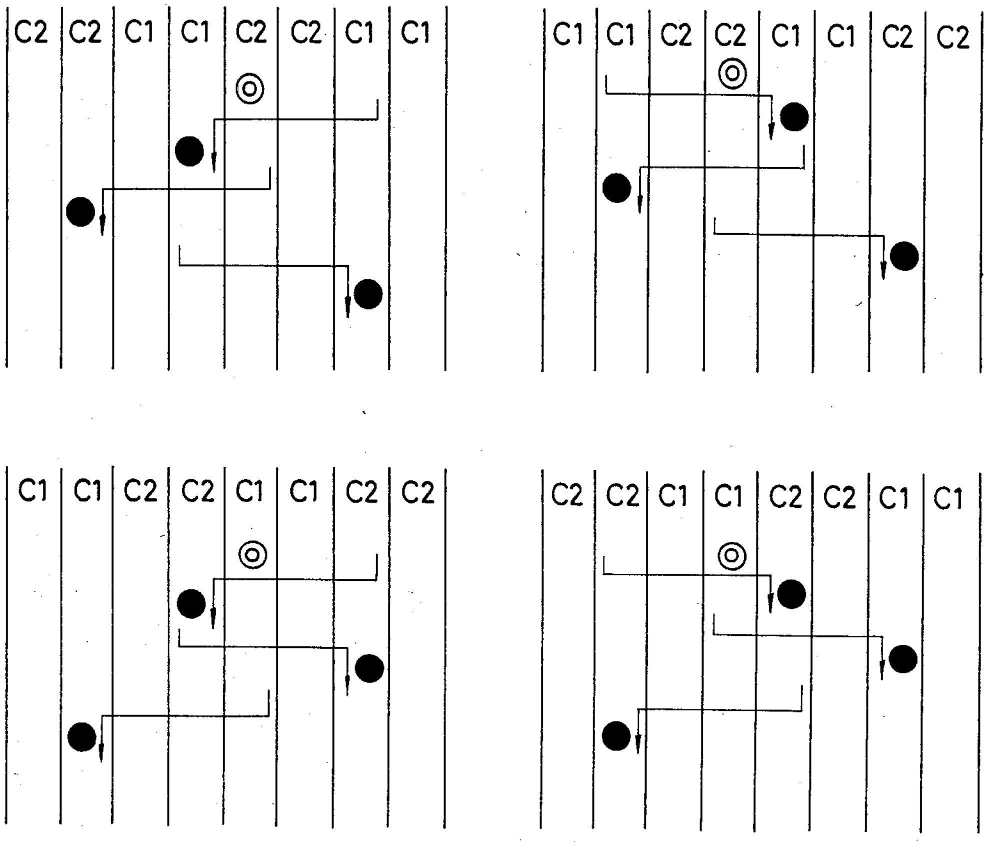
FIG. 4 is a diagram for explaining the various occurrence of leakage current.

FIG. 4 shows the occurrence of a leakage current in the respective data $D_0$, $D_8$ and $D_{15}$. In the drawing, the mark of double circle ( ) represents any of these data and black dot ( ) represents a bit in which printing is performed. The weight "11" is added to the data $D_0$, $D_8$ and $D_{15}$ whenever a leakage current occurs. The judgment as to whether a leakage current occurs or not in the data $D_0$, $D_8$ and $D_{15}$ is performed by detecting the status of the ten data $D_1$, $D_4$–$D_6$, $D_{10}$–$D_{13}$, $D_{17}$ and $D_{18}$.

Figure 5:
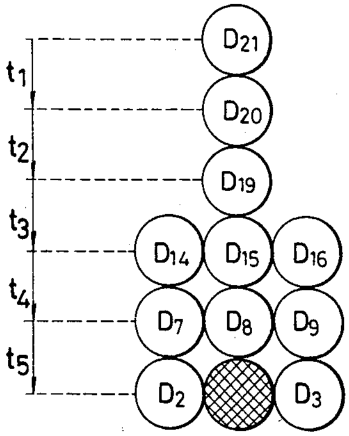
FIG. 5 is a diagram showing the arrangement of reference data for performing interval time correction among the data stored in the 6-line buffer.

The heat stored in the heater elements of the thermal head is radiated as time passes. In a thermo-sensitive recording apparatus in which the printing interval is not fixed for every line, it is necessary to calculate heat storage in the heater element corresponding to the data $D_0$ taking the printing interval into consideration. FIG. 5 corresponds to FIG. 2 and shows the data for taking the influence of the time interval into consideration in this embodiment. The time interval is defined as the time of one cycle from the start of printing on one line to the start of printing on the next line. Five time intervals, $t_1$ to $t_5$, are taken into consideration in this embodiment as shown in the drawing. The relations between the time intervals $t_1$–$t_5$ and the data (bit) affected by these time intervals are as shown in the following Table 2.

TABLE 2

| TIME INTERVALS | AFFECTED DATA |
|---|---|
| $t_5$ | $D_7$, $D_8$, $D_9$ |
| $t_4$, $t_5$ | $D_{14}$, $D_{15}$, $D_{16}$ |
| $t_3$, $t_4$, $t_5$ | $D_{19}$ |
| $t_2$, $t_3$, $t_4$, $t_5$ | $D_{20}$ |
| $t_1$, $t_2$, $t_3$, $t_4$, $t_5$ | $D_{21}$ |

First, description is made as to the date $D_7$, $D_8$ and $D_9$. In the case where the time interval (unit: m sec.) corresponds to the printing bit, the weighting to the data $D_7$, $D_8$ and $D_9$ is set to the relation as shown in the following Table 3.

TABLE 3

| $t_5$ | 2.5~5 | 5~10 | 10~20 | 20~ |
|---|---|---|---|---|
| $D_7$ | 40 | 20 | 10 | 4 |
| $D_8$ | 160 | 80 | 40 | 15 |
| $D_9$ | 40 | 20 | 10 | 4 |

Table 4 shows a similar relation as to the date $D_{14}$, $D_{15}$ and $D_{16}$.

TABLE 4 (1/4)

| $t_4$ | 2.5~5 | | | |
|---|---|---|---|---|
| $t_5$ | 2.5~5 | 5~10 | 10~20 | 20~ |
| $D_{14}$ | 17 | 8 | 2 | 0 |
| $D_{15}$ | 100 | 50 | 20 | 8 |
| $D_{16}$ | 17 | 8 | 2 | 0 |

TABLE 4 (2/4)

| $t_4$ | 5~10 | | | |
|---|---|---|---|---|
| $t_5$ | 2.5~5 | 5~10 | 10~20 | 20~ |
| $D_{14}$ | 6 | 1 | 0 | 0 |
| $D_{15}$ | 40 | 15 | 6 | 0 |
| $D_{16}$ | 6 | 1 | 0 | 0 |

TABLE 4 (3/4)

| $t_4$ | 10~20 | | | |
|---|---|---|---|---|
| $t_5$ | 2.5~5 | 5~10 | 10~20 | 20~ |
| $D_{14}$ | 9 | 3 | 0 | 0 |
| $D_{15}$ | 50 | 20 | 5 | 0 |
| $D_{16}$ | 9 | 3 | 0 | 0 |

TABLE 4 (4/4)

| | | | | |
|---|---|---|---|---|
| $t_4$ | 20~30 | | | 30~ |
| $t_5$ | 2.5~5 | 5~10 | 10~ | 2.5~ |
| $D_{14}$ | 0 | 0 | 0 | 0 |
| $D_{15}$ | 25 | 8 | 0 | 0 |
| $D_{16}$ | 0 | 0 | 0 | 0 |

TABLE 5 (1/6)

| | | | | |
|---|---|---|---|---|
| $t_3$ | 2.5~5 | | | |
| $t_4$ | 2.5~5 | | | |
| $t_5$ | 2.5~5 | 5~10 | 10~20 | 20~ |
| $D_{19}$ | 30 | 10 | 3 | 0 |

TABLE 5 (2/6)

| | | | |
|---|---|---|---|
| $t_3$ | 2.5~5 | | |
| $t_4$ | 5~10 | | |
| $t_5$ | 2.5~5 | 5~10 | 10~ |
| $D_{19}$ | 12 | 5 | 0 |

TABLE 5 (3/6)

| | | | |
|---|---|---|---|
| $t_3$ | 2.5~5 | | |
| $t_4$ | 10~20 | | 20~ |
| $t_5$ | 2.5~5 | 5~ | 5~ |
| $D_{19}$ | 5 | 0 | 0 |

TABLE 5 (4/6)

| | | | |
|---|---|---|---|
| $t_3$ | 5~10 | | |
| $t_4$ | 5~10 | | 10~ |
| $t_5$ | 2.5~5 | 5~ | 2.5~ |
| $D_{19}$ | 5 | 0 | 0 |

TABLE 5 (5/6)

| | | | |
|---|---|---|---|
| $t_3$ | 5~10 | | |
| $t_4$ | 2.5~5 | | |
| $t_5$ | 2.5~5 | 5~10 | 10~ |
| $D_{19}$ | 15 | 6 | 0 |

TABLE 5 (6/6)

| | | | | |
|---|---|---|---|---|
| $t_3$ | 10~20 | 10~20 | | 20~ |
| $t_4$ | 2.5~5 | 5~10 | 10~ | 2.5~ |
| $t_5$ | 2.5~5 | 2.5~5 | 5~ | 2.5~ |
| $D_{19}$ | 2 | 0 | 0 | 0 |

Table 6 shows a similar relation as to the data $D_{20}$.

TABLE 6 (1/6)

| | | | |
|---|---|---|---|
| $t_2$ | 2.5~5 | | |
| $t_3$ | 2.5~5 | | |
| $t_4$ | 2.5~5 | | |
| $t_5$ | 2.5~5 | 5~10 | 10~ |
| $D_{20}$ | 10 | 4 | 0 |

TABLE 6 (2/6)

| | | | |
|---|---|---|---|
| $t_2$ | 2.5~5 | | |
| $t_3$ | 2.5~5 | | |
| $t_4$ | 5~10 | | 10~ |
| $t_5$ | 2.5~5 | 5~ | 2.5~ |
| $D_{20}$ | 4 | 0 | 0 |

TABLE 6 (3/6)

| | | | | |
|---|---|---|---|---|
| $t_2$ | 2.5~5 | | | |
| $t_3$ | 5~10 | | | 10~ |
| $t_4$ | 2.5~5 | | 5~ | 2.5~ |
| $t_5$ | 2.5~5 | 5~10 | 2.5~ | 2.5~ |
| $D_{20}$ | 4 | 0 | 0 | 0 |

TABLE 6 (4/6)

| | | | |
|---|---|---|---|
| $t_2$ | 5~10 | | |
| $t_3$ | 2.5~5 | | |
| $t_4$ | 2.5~5 | | 5~ |
| $t_5$ | 2.5~5 | 5~ | 2.5~ |
| $D_{20}$ | 3 | 0 | 0 |

TABLE 6 (5/6)

| | | | | |
|---|---|---|---|---|
| $t_2$ | 5~10 | | | 5~10 |
| $t_3$ | 5~10 | | | 10~ |
| $t_4$ | 2.5~5 | | 5~ | 2.5~ |
| $t_5$ | 2.5~5 | 5~ | 2.5~ | 2.5~ |
| $D_{20}$ | 2 | 0 | 0 | 0 |

TABLE 6 (6/6)

| | | | | | |
|---|---|---|---|---|---|
| $t_2$ | 10~20 | | | | 20~ |
| $t_3$ | 2.5~5 | | | 5~ | 2.5~ |
| $t_4$ | 2.5~5 | | 5~ | 2.5~ | 2.5~ |
| $t_5$ | 2.5~5 | 5~ | 2.5~ | 2.5~ | 2.5~ |
| $D_{20}$ | 2 | 0 | 0 | 0 | 0 |

Table 7 shows a similar relation as to the data $D_{21}$.

TABLE 7 (1/3)

| | | | | | |
|---|---|---|---|---|---|
| $t_1$ | 2.5~5 | | | | |
| $t_2$ | 2.5~5 | | | | |
| $t_3$ | 2.5~5 | | | | |
| $t_4$ | 2.5~5 | | | 5~10 | |
| $t_5$ | 2.5~5 | 5~10 | 10~ | 2.5~5 | 5~ |
| $D_{21}$ | 6 | 2 | 0 | 3 | 0 |

TABLE 7 (2/3)

| | | | | | |
|---|---|---|---|---|---|
| $t_1$ | 2.5~5 | | | | |
| $t_2$ | 2.5~5 | | | | |
| $t_3$ | 2.5~5 | | | 5~10 | |
| $t_4$ | 10~20 | | 20~ | 2.5~5 | |
| $t_5$ | 2.5~5 | 5~ | 2.5~ | 2.5~5 | 5~ |

TABLE 7 (3/3)

| | | | | |
|---|---|---|---|---|
| $t_1$ | 2.5~5 | | | 5~ |
| $t_2$ | 2.5~5 | | 5~ | 2.5~ |
| $t_3$ | 5~10 | 10~ | 2.5~ | 2.5~ |
| $t_4$ | 5~ | 2.5~ | 2.5~ | 2.5~ |
| $t_5$ | 2.5~ | 2.5~ | 2.5~ | 2.5~ |
| $D_{21}$ | 0 | 0 | 0 | 0 |

The $X_i$ calculator 17 adds the above-mentioned three kinds of weights to the respective data $D_1$ to $D_{21}$ and supplies the respective results of calculation to the $T_i$ calculator 18.

The respective results of calculation from the $X_i$ calculator 16 are stored for every heater element in the $X_{i-1}$ memory, and are then supplied to the $T_i$ calculator delayed by a time corresponding to the printing of one line. The respective results of calculation are treated as heat history data of the thermal head 22.

Figure 6:
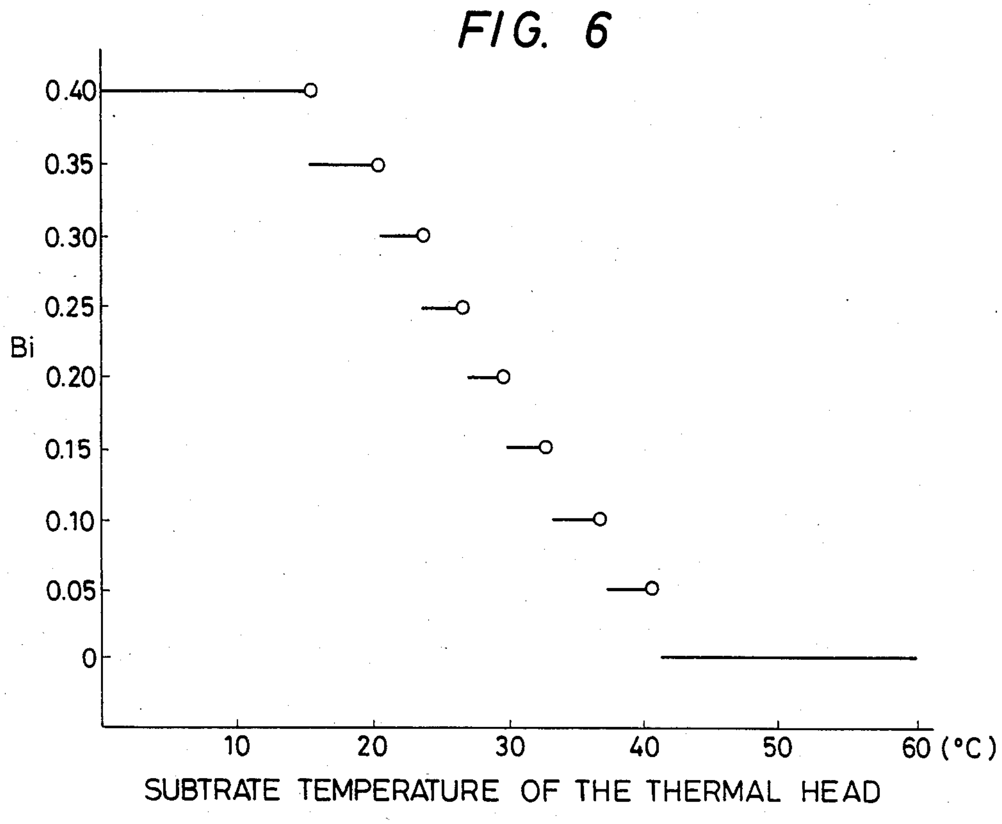
FIG. 6 is an explanatory diagram of memory contents showing the relation between the substrate temperature of the thermal head and the temperature correction data.

FIG. 6 shows the relation between the substrate temperature and the temperature correction data 25 of the thermal head. The $B_i$ calculator 29 incorporates therein a read only memory and produces data having a numerical value within a range from zero to 0.40 as the temperature correction data 25 on the basis of the substrate temperature of the thermal head 22 given thereto as address information. The temperature correction data 25 is supplied to the $T_i$ calculator 18.

Figure 7:
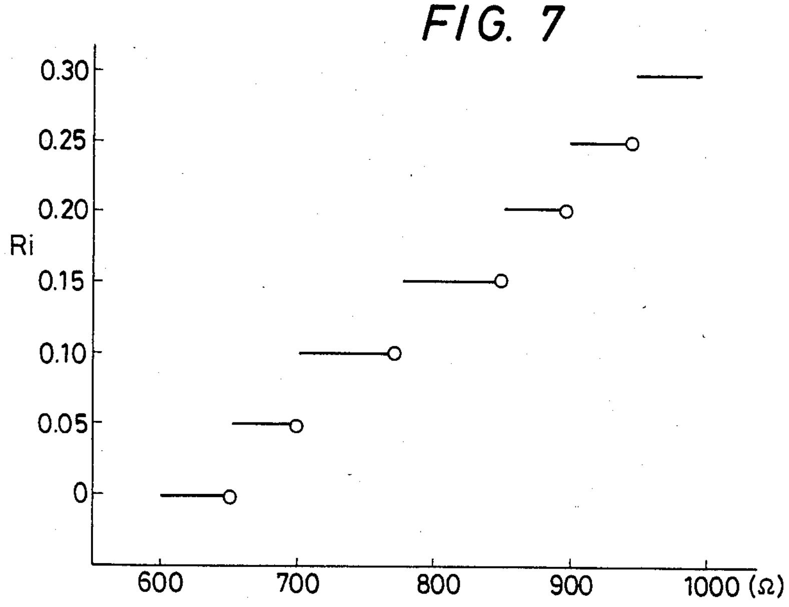
FIG. 7 is an explanatory diagram of memory contents showing relation between the resistance value of the thermal head and the resistance value correction data.

FIG. 7 shows the relation between the resistance value of each heater element of the thermal head 22 and the resistance value correction data 28. The $R_i$ calculator 27 also incorporates therein a read only memory and produces data with a numerical value within a range from zero to 0.30 as the resistance correction data 25 on the basis of the resistance value of each heater element given thereto as address information.

Figure 8:
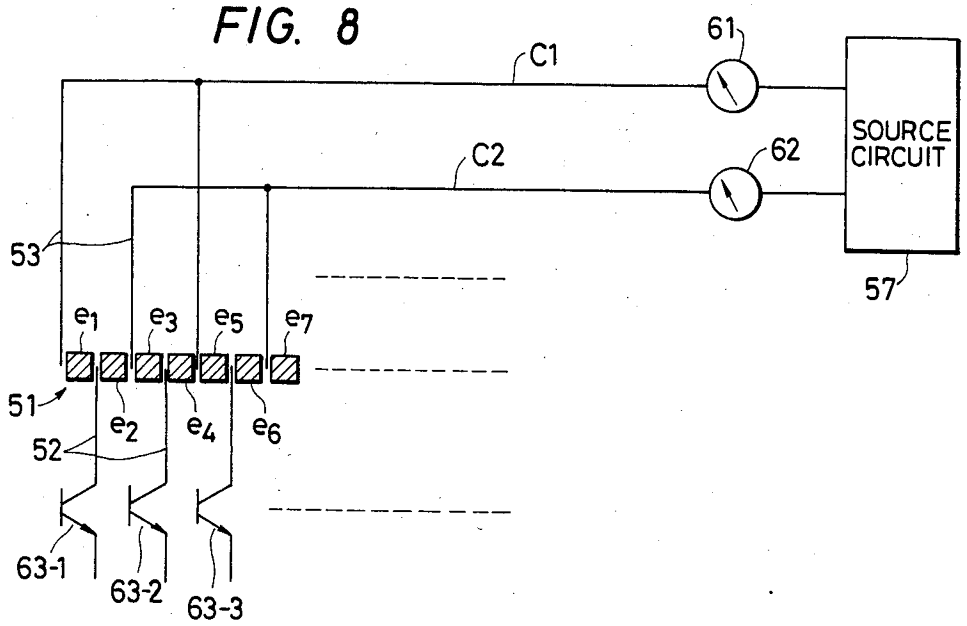
FIG. 8 is a diagram representing the principle of measurement of the resistance value of each heater element.

FIG. 8 shows the principle of measuring the resistance value of each heater element. In the drawing, a resistive heater 51 is divided into numbers of heater elements e1, e2, . . . by two groups of electrodes 52 and 53. A first ammeter 61 is disposed between a first common line C1 and a source circuit 57 and a second ammeter 62 is disposed between a second common line C2 and the source circuit 57. In this state, the two common lines C1 and C2 are supplied with a voltage from the source circuit 57 and a first switching element 63-1 connected to the electrode 52 is turned on. The other switching elements 63-2, 63-3 . . . are turned off at this time. In this state, only the two heater elements e1 and e2 are energized, and no leakage current exists in the other heater elements e3, e4 . . .

The output voltage of the source circuit 57 is represented by $V_{out}$, and the current values detected by the ammeters 61 and 62 are represented by $I_1$ and $I_2$, respectively. If the voltage drops in the line and the switching elements 63 are neglected, the respective resistance values $r_1$ and $r_2$ of the heater elements e1 and e2 can be expressed by the following equations, respectively:

$r_1 = V_{out}/I_1$ $r_2 = V_{out}/I_2$

If the printing data within a not-shown shift register is shifted by one stage and when the same operation as described above is performed, only the second switching element 63-2 is now turned on. Thus, the respective resistance values $r_3$ and $r_4$ of the heater elements e3 and e4 can be obtained. The resistance values of all the heater elements can be similarly obtained. Such resistance measurement is automatically performed, for instance, upon turning on of the power source to the thermo-sensitive recording apparatus, and the $R_i$ calculator 27 calculates the resistance correction data 28 for every heater element. The resistance correction data 28 are supplied to the $T_i$ calculator 18.

The $T_i$ calculator 18 performs calculation by an adder incorporated therein to add the temperature correction data 25 and the resistance correction data 28 for every heater element. With respect to each heater element, the heat storage correction data 17 and the heat history correction data 21 are added to each other as nonlinear data.

That is, although the heat storage correction data 17 and the heat history correction data 21 are each expressed as a numerical value within a range from 0 to 700, the data for addition are replaced by numerical values within a range from 0.2 to 0.6 in conjunction with the sum of the temperature correction data 25 and the resistance correction data 28. The replaced numerical value is added to the sum of the temperature correction data 25 and the resistance correction data 28 to obtain a basic printing pulse width for every heater element. The result of the calculation is produced as pulse width data 31 for each heater element.

A printing data gate control circuit 32 decodes the printing pulse width for every heater element on the basis of the pulse width data 31 and produces gate control signals for causing the gate circuit 34 to turn on selected gates in the number corresponding to the quotient obtained by dividing the pulse width by 0.5 m sec.

Figure 9:
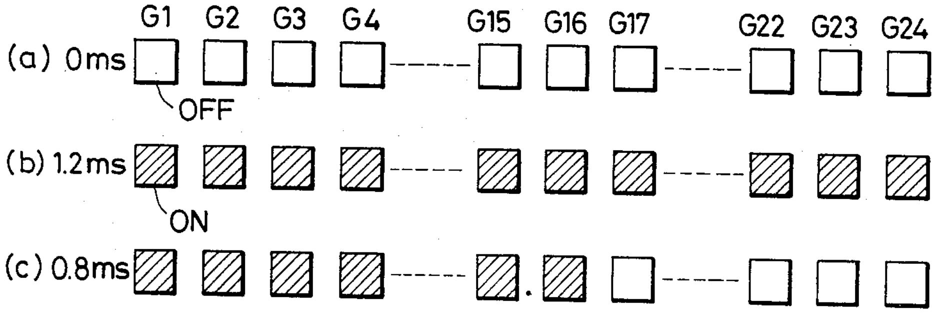
FIG. 9 is an explanatory diagram showing the status of gate control by the printing data gate control circuit.
Figure 10:
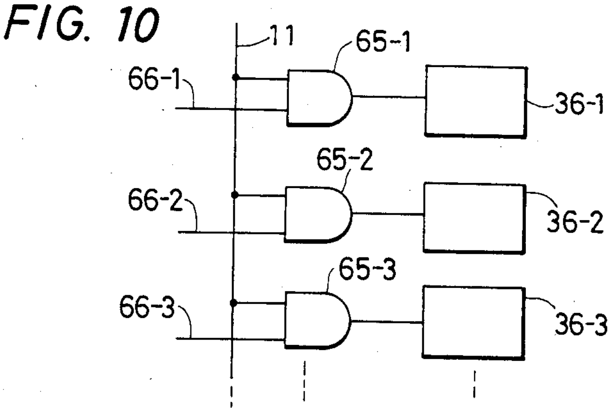
FIG. 10 is a block diagram showing the gate circuit and a part of the buffer.

FIG. 9 illustrates this status, in which the twenty-four gates of the gate circuit 34 are designated by G1 to G24. If the printing pulse width is 0 m sec., as shown in FIG. 9(*a*), the gate control signals do not turn on any of the gates. If the printing pulse width takes the longest value, that is 1.2 m sec., as shown in FIG. 9(*b*), the control signals turn on all the gates. If the pulse width is, for instance, 0.8 m sec., as shown in FIG. 9(*c*), sixteen of the gate control signals are turned on to turn on the sixteen gates G1 to G16 on the basis of the quotient obtained by dividing 0.8 by 0.05. The remainder of the gates are left off.

The gate circuit 34 is constituted by twenty-four 2-input AND gates 65-1 to 65-24 which receive the above-mentioned gate control signals 66-1 to 66-24 at one input with the other input of each gate being supplied with the printing data 11. The data indicating the necessity of energization for every heater element of the thermal head 22 are written into the first to twenty-fourth buffers 36-1 to 36-24. For instance, if the printing data 11 indicates printing for the heater elements for which the pulse width has been determined to be 0.8 m sec., a signal "1" is written into each of the first to sixteenth buffers 36-1 to 36-16 located at the positions corresponding to the heater elements to be energized.

If printing is specified in accordance with a pulse width of 1.2 m sec., a signal "1" is written into each of the buffers 36-1 to 36-24. Similarly, a signal "0" indicating that no printing operations are to be performed is written into each of the buffers 36-1 to 36-24 even if the pulse width has determined to have a value other than 0 m sec., unless the printing data indicates printing for the heater elements. In the manner as described above, the pulse width is determined independently from the printing data, and a signal "1" or "0" is written into each of the buffers 36-1 to 36-24.

Upon completion of writing data into the respective buffers 36-1 to 36-24, reading-out of the data will begin with the first buffer 36-1. The black rate counter 38 counts the number of signals having the value of "1" for all of the buffers 36-1 to 36-24 and produces count data 39 which express the number of "1" values as a percentage of the whole.

The count data 39 are supplied to the $W_i$ calculator 41. The $W_i$ calculator calculates the correction value for the printing pulse time-width for every buffer 36-1 to 36-24. Generally, the smaller the buffer number, the higher the black rate of the printing data. Accordingly, there is a possibility that a relatively large amount of electric power is consumed to generate an excessive voltage drop through lines. Of course, the black rate will vary widely depending on the contents to be printed. The $W_i$ calculator 41 compensates for the reduction in thermal energy generated by the respective heater elements, due to the voltage drop. The pulse width correction data are calculated on the basis of the relation shown in FIG. 11.

In the corrected pulse width calculator 43, the correction data for a printing pulse width is added to the basic printing pulse width to produce applied pulse width data 44. An applied pulse 46 is generated successively with the pulse width indicated by the applied pulse width data 44 so that the printing operation is performed by the thermal head 22 by using printing data 37-1 to 37-24 respectively correspondingly read out of the buffers.

Figure 12:
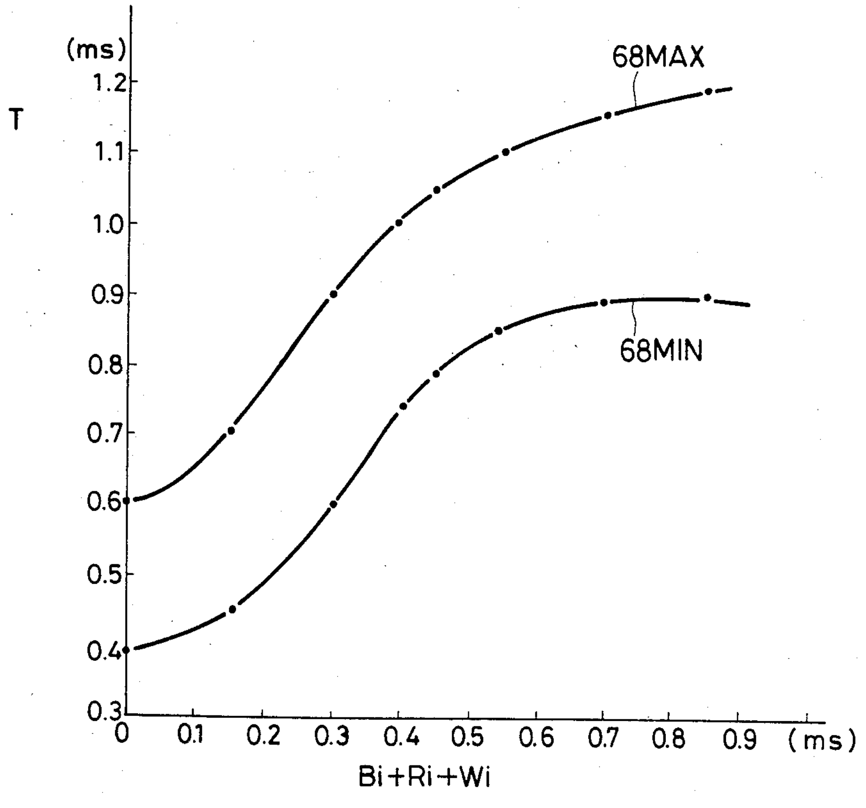
FIG. 12 is an explanatory diagram showing the relation between the pulse width T and various kinds of correction data.

FIG. 12 shows the relation between a final pulse width T obtained as the result of calculation by the corrected pulse width calculator 43 and the various correction data as described directly above. In the drawing, the abscissa represents the sum of $B_i$, $R_i$, and $W_i$ ($B_i$ represents the temperature correction data 25, $R_i$ the resistance value correction data 26, and $W_i$ the pulse width correction data 42). The pulse width T actually applied to a heater element is determined by the intersecting point of the minimum weighting curve $68_{MIN}$, the maximum weighting curve $68_{MAX}$, or any one of a large number of curves which are parallel with and between the minimum weighting curve $68_{MIN}$ and the maximum weighting curve $68_{MAX}$.

If the heat storage correction data 17 and the heat history correction data 21 are represented by $X_i$ and $X_{i-1}$, respectively, a determination is made as to which one of the curves is applied to the individual heater elements depending on these data $X_i$ and $X_{i-1}$. In other words, the degree of contribution of the data $X_i$ and $X_{i-1}$ to the pulse width T varies depending on the other data $B_i$, $R_i$, and $W_i$.

FIG. 13 shows the relation among the various values of data as described directly above, in conjunction with the maximum value (MAX) and the minimum value (MIN). For example, as shown in the column (1), in the case where all the values of $B_i$, $R_i$, and $W_i$ are zero and when both the values of $X_i$ and $X_{i-1}$ are 700(MAX), the minimum value 0.4 (m sec.) is selected to balance the thermal energy. Accordingly, the pulse width T is determined to be 0.4 m sec. On the other hand, as shown in column (9), when the sum of the values of $B_i$, $R_i$, and $W_i$ reaches the maximum value 0.85 (m sec.), the value 0.35 m sec., which is smaller than the value 0.4 m sec., is selected as the value of $X_i$ and $X_{i-1}$, and the pulse width T is determined to be 1.2 m sec.

Figure 14:
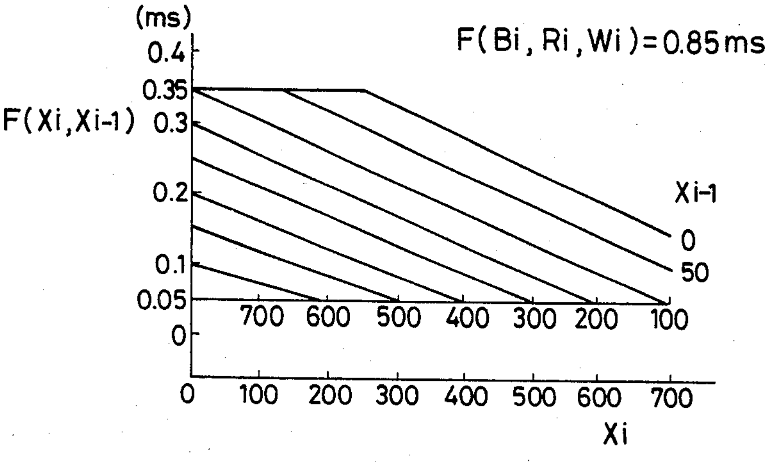
FIGS. 14 to 16 are characteristic diagrams each showing, by way of example, the relation between $X_i$ and $X_{i-1}$.
Figure 15:
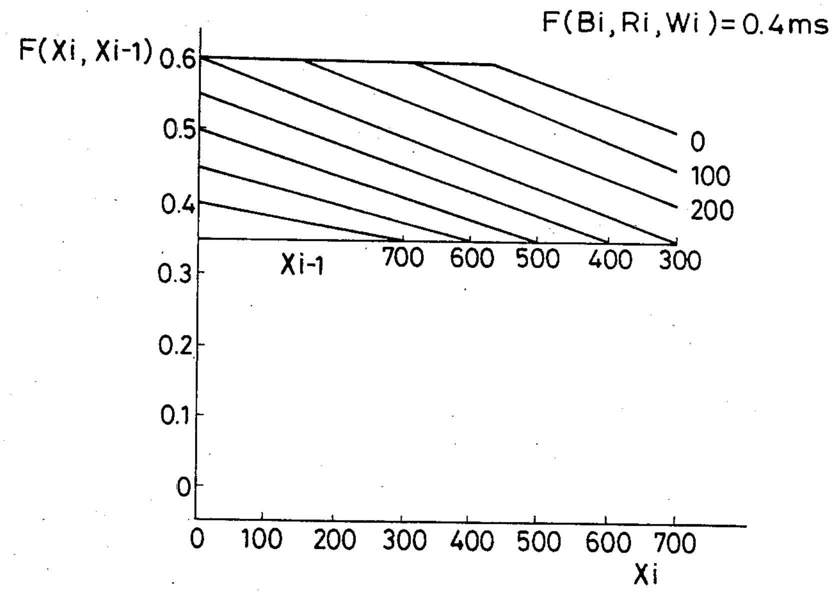
Figure 16:
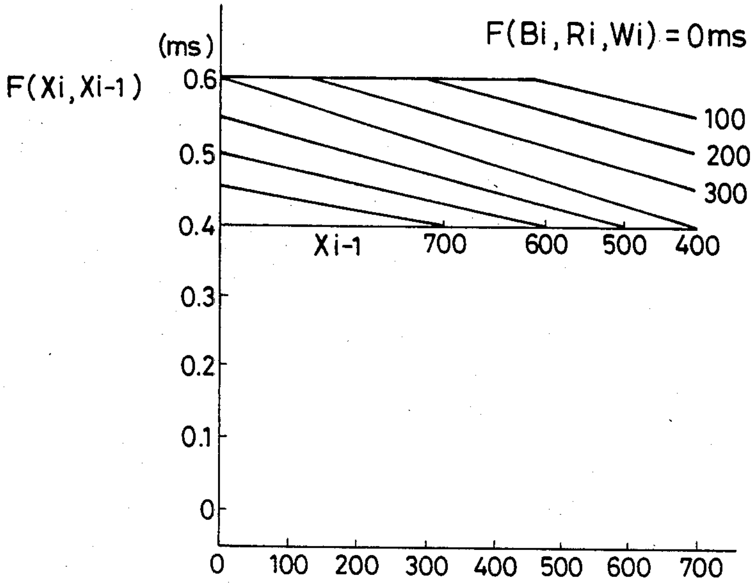
Figure 17:
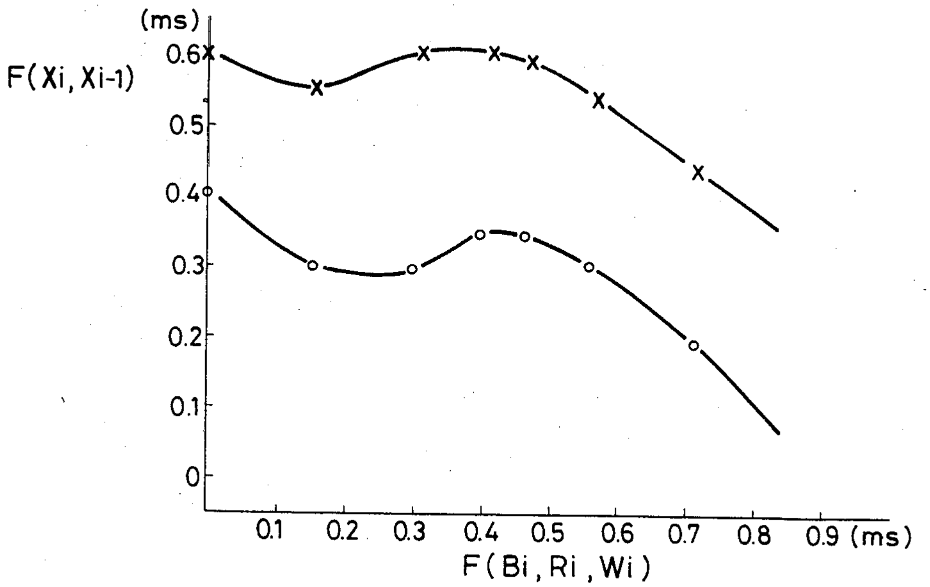
FIG. 17 is an explanatory diagram showing the relation between the functions $F(B_i, R_i, W_i)$ and $F(X_i, X_{i-1})$.

FIGS. 14 to 16 show three cases of the relation of $X_i$ and $X_{i-1}$. In these drawings, a function $F(B_i, R_i, W_i)$ is the sum of the data $B_i$, $R_i$, and $W_i$. The ordinate represents the actually evaluated value $F(X_i, X_{i-1})$ of the data $X_i$ and $X_{i-1}$. FIG. 17 shows a general relation between the functions $F(B_i, R_i, W_i)$ and $F(X_i, X_{i-1})$.

Figure 18:
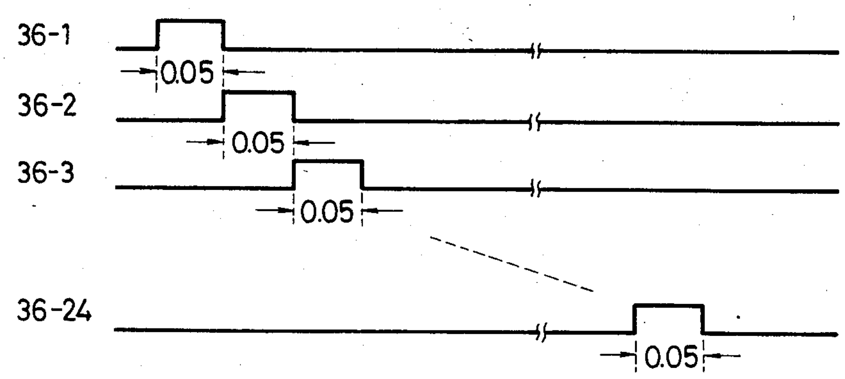
FIG. 18 is a time chart showing various timings of unit recording operations in the case where no black rate correction is performed.
Figure 19:
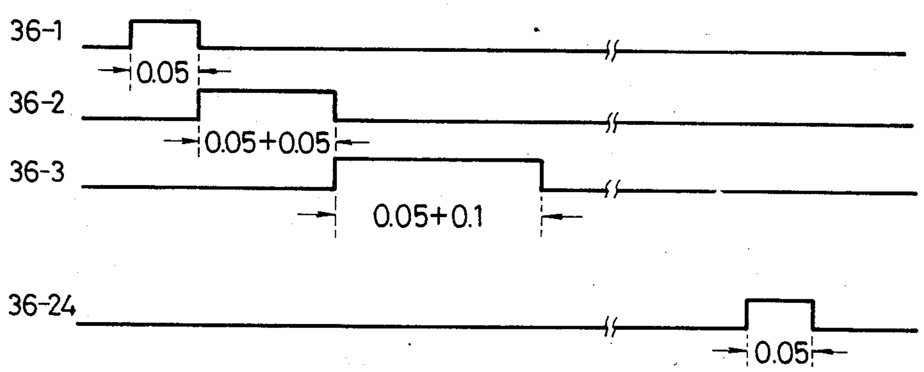
FIG. 19 is a time chart showing an example of the timings of unit recording operations in the case where black rate correction is performed.

The driver 45 applies the applied pulse 46 of the pulse width T, which has been determined in the manner as described above, to the thermal head 22. FIGS. 18 and 19 explain the timing cycles for printing the data written in the buffers 36-1 to 36-24 respectively.

FIG. 18 shows the status on the assumption that the pulse width correction has not been performed by the $W_i$ calculator 43. In this case, each of the buffers 36-1 to 36-24 produces the applied pulse 46 of the pulse width of 0.05 m sec. for every unit recording operation. The total pulse width for the heater elements becomes 1.2 m sec. at longest, which value is the total sum of the respective pulse widths of 0.05 m sec.

Figure 11:
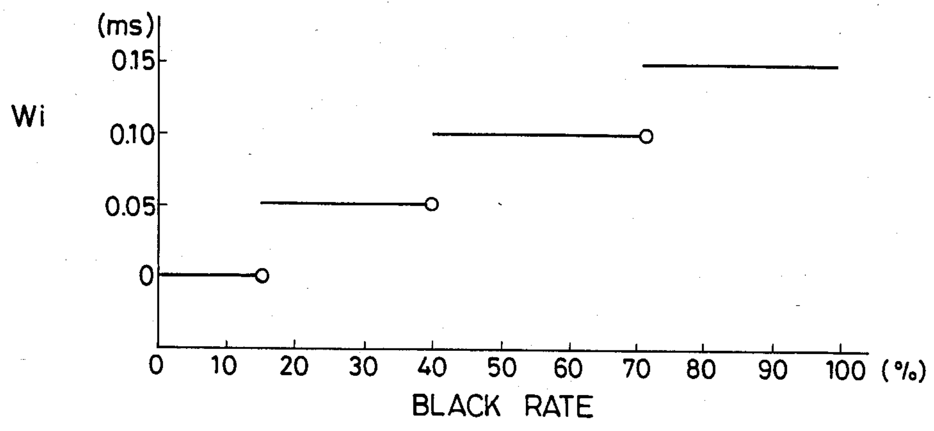
FIG. 11 is an explanatory diagram of memory contents showing the relation between the black rate and the pulse width correction data.

The actually applied pulse width for every recording operation is, for example, as shown in FIG. 19. That is, the increment of the pulse width is performed by the $W_i$ calculator 43 by a multiple of 0.05 m sec. as shown in FIG. 11. Thus, in the case of the second buffer 36-2, for example, correction of 0.05 m sec. is made to the basic pulse width of 0.05 m sec. so as to perform a unit recording operation with the total time-width of 0.1 m sec. Alternatively, in the case of the third buffer 36-3, for example, since the number of the simultaneously energized heater elements is large, correction of 0.1 m sec. is attained so that a unit recording operation is performed with a total pulse width of 0.15 m sec.

As described above, according to the present invention, the thermal energy of the thermal head is accurately corrected in accordance with the various status of the thermo-sensitive recording apparatus so that it is possible to obtain recorded pictures of high picture quality. In a thermo-sensitive recording apparatus incorporated with a micro-computer, it is possible to attain various kinds of calculation and control for thermal energy correction without requiring any special parts, whereby the apparatus can be constructed inexpensively.

It should be understood that the present invention is not limited to the particular embodiment described, but rather is susceptible to modifications, alterations, and arrangements within the scope of the appended claims and their equivalents.

What is claimed is:

1. A thermo-sensitive recording apparatus in which thermal recording is made on successive lines of a medium under the control of selective energization of a plurality of heater elements formed in a substrate and constituting a thermal head, the apparatus comprising:

heat storage correction data forming means for generating latent heat correction data corresponding to the quantity of latent heat energy stored in each of the heater elements;

a thermal history correction data forming means for generating thermal history correction data for each of the heater elements in accordance with the state of the elements during printing of a selected number of preceding print lines;

a heater element resistance value correction data forming means for generating resistance data for each of the heater elements corresponding to the actual resistance of the heater elements;

a black percentage correction data forming means for forming solid image correction data for energy to be applied to the thermal head in accordance with the number of heater elements to be energized during printing of a print;

substrate temperature correction data forming means for forming substrate correction data corresponding to the temperature of the substrate; and applied energy control means for individually controlling energization of the heater elements in accordance with said latent heat correction data, said thermal history correction data, said resistance data, said solid image correction data, and said substrate correction data.

2. A thermo-sensitive recording apparatus according to claim 1, wherein said heat storage correction data forming means comprises means for generating said latent heat correction data for each individual heater element in accordance with the energization levels of said individual heater element and of selected heater elements proximate said individual heater element and the elapsed time between the printing of a selected number of preceding lines.

3. A thermo-sensitive recording apparatus according to claim 2, wherein said applied energy control means includes means for controlling the energization of the individual heater elements by adjusting the width of energization pulses applied to each of the heater elements.

4. A thermo-sensitive recording apparatus according to claim 3, wherein each energization pulse applied to a heater element comprises a basic pulse and an auxiliary pulse, the pulse width of said basic pulse being controlled by said applied energy control means in accordance with said thermal history correction data for that heater element.

5. A thermo-sensitive recording apparatus according to claim 4, wherein said applied energy control means includes means for establishing the pulse width of each of said auxiliary pulses in accordance with said solid image correction data.

6. A thermo-sensitive recording apparatus according to claim 5, wherein said applied energy control means comprises:

first means for combining said latent heat correction data, said thermal history correction data, said resistance data, and said substrate correction data to generate combined correction data corresponding to each heater element; and a gate array comprising a plurality of gate circuits, each of said gate circuits being associated with a different one of each of the heater elements and having a first input terminal for receiving said combined correction data corresponding to said heater element associated with said associated gate circuit, a second input terminal for receiving a gate energization signal for controlling the energization of said gate circuit associated each of the heater elements, and an output terminal for outputting a heater element control signal for controlling the energization of the heater element associated with said gate circuit.

7. A thermo-sensitive recording apparatus according to claim 6, wherein said applied energy control means further comprises:

a pulse width generator for generating an energization pulse for each of the heater elements in accordance with said heater element control signal for the heater element and said solid image correction data; and a heater element driver circuit for individually energizing each of the heater elements in accordance with said energization pulses.

8. A thermo-sensitive recording apparatus for thermally recording selected images on successive lines of a medium by the selective energization of a plurality of heater elements formed in a substrate and constituting a thermal head, the apparatus comprising:

means for generating data concerning the temperature of the substrate, the latent heat energy of each of the heater elements, the history of energization of the individual heater elements and selected heater elements proximate thereto, and the resistance of each heater element;

means for combining said data to generate a pulse duration signal singly corresponding to each of the heater elements; and means for gating said pulse duration signals to said corresponding heater elements in accordance with printing signals selectively indicating which of the heater elements are to be energized during the printing of a line of images on the medium.

9. A thermo-sensitive recording apparatus according to claim 8 further including:

means for generating duration control signals corresponding to the number of the printing elements to be simultaneously energized during the printing of a line; and means for controlling the duration of energization of each of the selected printing elements in accordance with said duration control signals.

10. A thermo-sensitive recording apparatus according to claim 9, further including means for separately measuring the resistance of each of the heater elements upon powering up of the thermo-sensitive recording apparatus.

* * * * *